US010762900B2

(12) United States Patent
Ben-dor et al.

(10) Patent No.: US 10,762,900 B2
(45) Date of Patent: Sep. 1, 2020

(54) IDENTIFICATION AND PROCESSING OF COMMANDS BY DIGITAL ASSISTANTS IN GROUP DEVICE ENVIRONMENTS

(71) Applicant: Microsoft Technology Licensing, LLC, Redmond, WA (US)

(72) Inventors: Karen Master Ben-dor, Kfar Saba (IL); Roni Karassik, Ramat Gan (IL); Adi Diamant, Tel-Aviv (IL); Adi Miller, Ramat Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 15/914,639

(22) Filed: Mar. 7, 2018

(65) Prior Publication Data
US 2019/0279615 A1 Sep. 12, 2019

(51) Int. Cl.
*G10L 15/22* (2006.01)
*G10L 15/18* (2013.01)
*G10L 17/00* (2013.01)
*H04L 12/24* (2006.01)
*G06F 3/16* (2006.01)
(Continued)

(52) U.S. Cl.
CPC ............. *G10L 15/22* (2013.01); *G06F 3/167* (2013.01); *G10L 13/00* (2013.01); *G10L 15/00* (2013.01); *G10L 15/1822* (2013.01); *G10L 17/00* (2013.01); *G10L 17/005* (2013.01); *G10L 25/00* (2013.01); *H04L 41/0893* (2013.01); *G10L 2015/223* (2013.01); *G10L 2015/228* (2013.01)

(58) Field of Classification Search
CPC ....................................................... G10L 15/22
See application file for complete search history.

(56) References Cited

U.S. PATENT DOCUMENTS 8,645,514 B2  2/2014 Gnanasambandam et al.
9,729,592 B2  8/2017 Slayton et al.
(Continued)

FOREIGN PATENT DOCUMENTS

EP  2801973 A1  11/2014
WO  2017161139 A1  9/2017

OTHER PUBLICATIONS

"International Search Report and Written Opinion Issued in PCT Application No. PCT/US2019/020156", dated May 23, 2019, 12 Pages. (MS# 403724-WO-PCT).
(Continued)

*Primary Examiner* — Douglas Godbold

(57) ABSTRACT

In non-limiting examples of the present disclosure, systems, methods and devices for executing a command by a digital assistant in a group device environment are presented. A plurality of devices with digital assistants may be clustered for the duration of an event. One of the devices of the cluster may be assigned as an arbitrator device for the cluster. A user may issue a verbal command executable by a digital assistant of the cluster. The user that issued the verbal command may be identified via voice analysis. A determination may be made as to whether the verbal command corresponds to an intent to share content with a plurality of members of the cluster, or a specific member of the cluster, and a device of the cluster may be selected for executing a reply to the verbal command based on the determined intent and the executing device's presentation capabilities.

20 Claims, 9 Drawing Sheets

(51) Int. Cl.
   *G10L 13/00*   (2006.01)
   *G10L 25/00*   (2013.01)
   *G10L 15/00*   (2013.01)

(56) References Cited

U.S. PATENT DOCUMENTS

| | | | |
|---|---|---|---|
| 10,157,042 B1* | 12/2018 | Jayakumar | G10L 15/22 |
| 10,374,816 B1* | 8/2019 | Leblang | G10L 15/22 |
| 10,425,780 B1* | 9/2019 | Devaraj | G06T 7/80 |
| 10,536,288 B1* | 1/2020 | Leblang | H04W 40/244 |
| 2004/0044516 A1 | 3/2004 | Kennewick et al. | |
| 2009/0182813 A1 | 7/2009 | McCartie et al. | |
| 2014/0244712 A1 | 8/2014 | Walters et al. | |
| 2014/0344627 A1 | 11/2014 | Schaub et al. | |
| 2015/0066817 A1 | 3/2015 | Slayton et al. | |
| 2015/0142447 A1* | 5/2015 | Kennewick | G10L 15/1822 704/275 |
| 2015/0186154 A1 | 7/2015 | Brown et al. | |
| 2015/0370531 A1* | 12/2015 | Faaborg | G06F 3/167 704/275 |
| 2016/0155443 A1* | 6/2016 | Khan | G06F 1/3203 704/275 |
| 2017/0076720 A1* | 3/2017 | Gopalan | G06F 3/167 |
| 2017/0083285 A1* | 3/2017 | Meyers | G10L 15/063 |
| 2017/0357478 A1* | 12/2017 | Piersol | G06F 3/167 |
| 2018/0039478 A1 | 2/2018 | Sung et al. | |
| 2018/0108351 A1* | 4/2018 | Beckhardt | G10L 15/32 |
| 2019/0066670 A1* | 2/2019 | White | G10L 15/22 |

OTHER PUBLICATIONS

Mayo, Benjamin, "With iOS 10, 'Hey Siri' intelligently activates on just one nearby device at a time [Video]", Retrieved From «https://9to5mac.com/2016/06/30/ios-10-intelligent-hey-siri-multiple-devices/», Jun. 30, 2016, 4 Pages.

* cited by examiner

IDENTIFICATION AND PROCESSING OF COMMANDS BY DIGITAL ASSISTANTS IN GROUP DEVICE ENVIRONMENTS

BACKGROUND

As the capabilities of digital assistants (e.g., Cortana, Siri, Alexa) has increased, so has their use in the home and workplace. Users frequently access digital assistants to quickly and efficiently obtain answers, and have content surfaced, in response to verbal commands. As the utilization of digital assistants, and their incorporation into a variety of computing devices, has become nearly ubiquitous, it has become increasingly common for users to attempt to verbally interact with a digital assistant in environments that include multiple devices that each have an integrated digital assistant.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for executing a verbal command by a digital assistant in a group device environment. A cluster comprising a plurality of computing devices integrated with a digital assistant may be created. In some examples, the plurality of devices may be automatically clustered based on one or more indicators comprising: a physical location of the devices, a physical proximity of the devices, a clustering event associated with the devices, and a location associated with a clustering event. In other examples, the plurality of computing devices may be clustered based on user selection to create or join a cluster. Upon creating a cluster, one of the plurality of devices in the cluster may be selected or assigned as an arbitrator device for directly responding to verbal digital assistant commands from cluster members. When verbal digital assistant commands are issued by a cluster member in proximity of a clustered device, the arbitrator device sends those commands to a digital assistant service for processing. The processing may comprise identifying a cluster member that issued the command and identifying a command intent associated with the command. The command intent may comprise an execution intent and a privacy intent. Upon processing a verbal command, the digital assistant service may determine, based on the execution intent and the privacy intent, one or more devices in the cluster from which to respond (e.g., display a response, audibly communicate a response) to the verbal command.

BRIEF DESCRIPTION OF THE DRAWINGS

Non-limiting and non-exhaustive examples are described with reference to the following figures.

DETAILED DESCRIPTION

Figure 1:
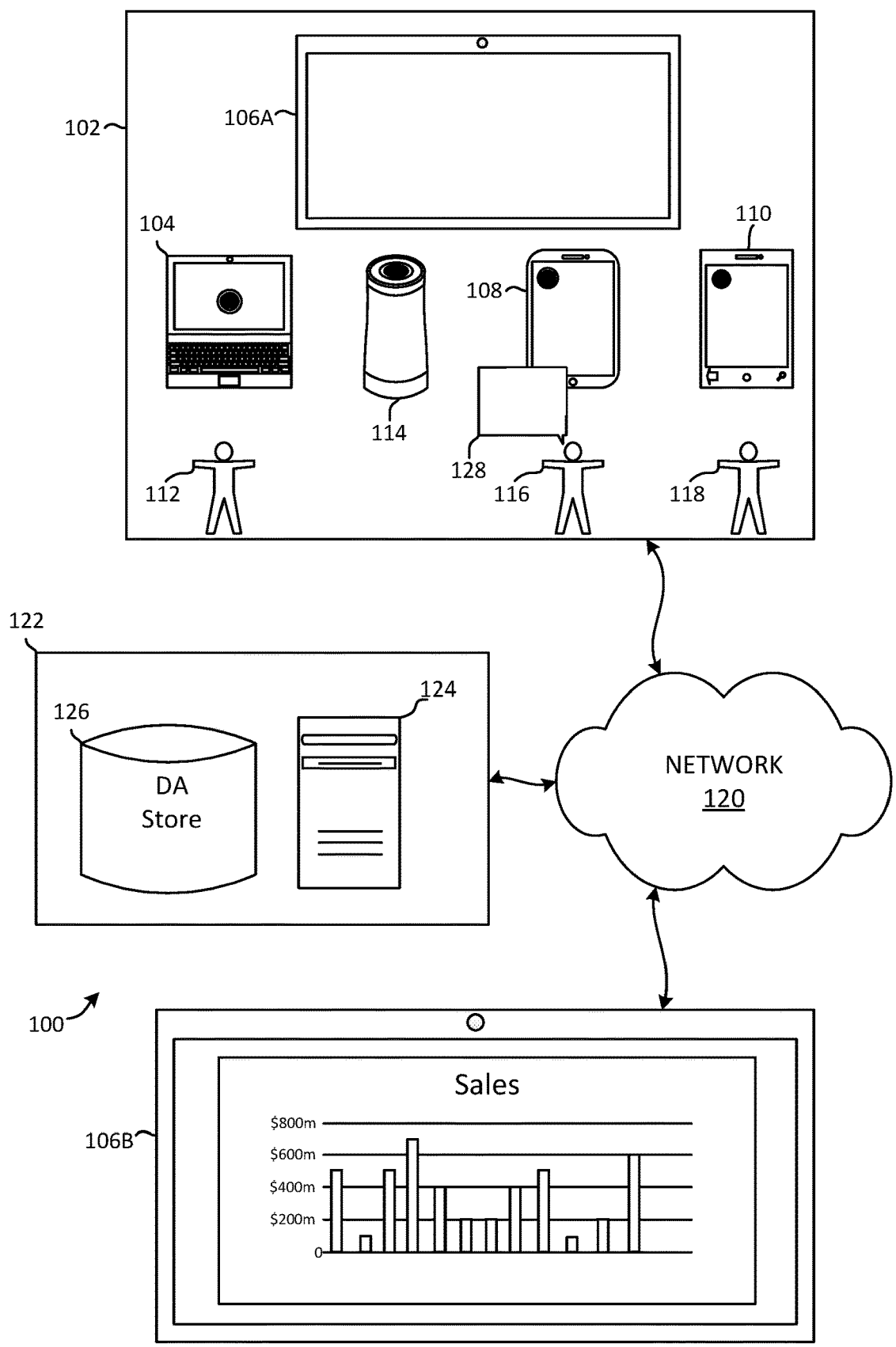
FIG. 1 is a schematic diagram illustrating an example distributed computing environment for assisting with execution of a verbal command by a digital assistant in a clustered group of devices.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for assisting with execution of commands by digital assistants in group device environments, where a plurality of devices in physical proximity are integrated with digital assistants. In some examples, one or more of the digital assistants may also be associated with one or more user profiles. According to aspects described herein, a plurality of devices in physical proximity of one another that are integrated with a digital assistant may be clustered for handling verbal commands from one or more members of a cluster event.

According to examples, a plurality of devices integrated with digital assistants may automatically be clustered upon determining that the plurality of devices are within a physical proximity threshold of one another. In additional examples, a plurality of devices integrated with digital assistants may automatically be clustered upon determining that a cluster event is associated with one or more applications executed by each of the plurality of devices, and that a start time for the clustering event has occurred, or is within a temporal threshold of occurring. For example, each of a plurality of users may have a joint meeting scheduled in a calendar application associated with each user's device, and upon reaching the start time for the meeting, or upon reaching a temporal threshold of that start time for the meeting (e.g., 5 minutes before the meeting), each user's device may be automatically clustered for the duration of the meeting event. In other examples, a plurality of devices integrated with a digital assistant may automatically be clustered only when: each of the plurality of devices are within a physical proximity threshold of one another, and a determination has been made that a start time for a joint cluster event associated with each of the plurality of devices has occurred, or is within a temporal threshold of occurring. In still other examples, a cluster may be formed via a cluster sign-in process. For example, a clustering application, or a clustering feature associated with one or more applications executed by one or more of the plurality of devices, may be utilized by users to start a new cluster, or join an existing cluster for a cluster event.

According to some examples, upon a cluster being formed, a digital assistant service to which digital assistant commands are routed, may generate a list comprising information about the devices in the cluster and/or users of those devices. The list may comprise one or more of: an identity of each device in a cluster, presentation capabilities of each device in a cluster (e.g., whether a device has display capabilities, whether a device has speaker capabilities, whether a device is a personal device, whether a device is a group use device), a user ID associated with each device in the cluster, and a list of accounts associated with user IDs for each device in the cluster.

In some examples, upon clustering a plurality of devices integrated with digital assistants, one of the plurality of devices (and its corresponding digital assistant) may be assigned as an arbitrator device, or cluster manager, for the cluster. In additional examples, upon assigning one of the plurality of devices (and its corresponding digital assistant) as an arbitrator device of a cluster, each digital assistant on each other device in the cluster may be disabled from directly responding to verbal and/or gesture commands for the duration of the cluster. For example, upon assigning one of the plurality of devices as an arbitrator device of a cluster, each other device in the cluster may be disabled from sending requests to a digital assistant service. According to some aspects, a cluster member may override the disabling of a device in the cluster from directly responding to a verbal command. For example, a cluster member may provide an indication to a device in the cluster that a digital assistant associated with the device should directly handle a verbal command, regardless of the device not being the arbitrator for a cluster, by for example, interacting with a push-to-talk feature on the device (e.g., a user may initiate direct handling of a voice command by a device's digital assistant in a cluster by performing a mouse click in relation to a soft microphone user interface element associated with a digital assistant on a corresponding clustered device, and/or providing a touch to a touch-sensitive display in proximity to a soft microphone user interface element associated with a digital assistant on a corresponding clustered device.

An arbitrator device may be automatically selected based on criteria associated with the arbitrator device and/or each other device in a cluster. For example, if a cluster comprises a plurality of personal devices with integrated digital assistants that are each associated with a single user or user account, and one group use device that is integrated with a digital assistant that is associated with a plurality users or user accounts, the group use device may be automatically selected as the arbitrator device of the cluster. In other examples, if a cluster comprises a plurality of devices with integrated digital assistants, and one of the plurality of devices is capable, alone or in combination with a digital assistant service, of identifying a specific user based on voice or linguistic analysis, that one device may be automatically selected as the arbitrator device of the cluster. In still other examples, if a cluster comprises a plurality of devices with integrated digital assistants, and one of the plurality of devices is capable, alone or in combination with a digital assistant service, of determining a command intent associated with user requests and/or user commands, that one device may be automatically selected as the arbitrator device of the cluster. In additional examples, a device may be selected as an arbitrator device of a cluster based on a determination that it has group presentation capabilities that are unique to it amongst the other devices in the cluster.

In one example, if one of a plurality of devices in a cluster is integrated with a group display and/or a group speaker system, that one device may be selected as an arbitrator for that cluster. In another example, cluster members (i.e., users associated with the devices in a cluster) may be presented with a selectable option, in a clustering application or a clustering feature in an application, to assign one of the plurality of devices of a cluster as an arbitrator for a cluster. For example, if a cluster comprises a plurality of personal devices, with each device associated with a single user ID, a selectable option may be presented on one or more of those devices to assign one of the devices of the cluster as an arbitrator for the cluster. In another example, if a cluster comprises a plurality of group use devices (e.g., devices with digital assistants that are associated with multiple user IDs, devices with digital assistants that generically handle requests from any requesting user), a selectable option may be presented to members of the cluster to designate one of those group use devices as an arbitrator for that cluster. In still other examples, upon the creation of a cluster, a user interface comprising one or more of the following features may be presented for selecting one of a plurality of devices in the cluster as an arbitrator for the cluster: a name of each device in the cluster, an illustration of each device in the cluster, identities of one or more available digital assistants for each device in the cluster, one or more user IDs associated with each device in the cluster, one or more user IDs associated with a digital assistant for each device in the cluster, voice recognition capabilities associated with each device in the cluster, intent identification capabilities associated with each device in the cluster, display capabilities associated with each device in the cluster, and sound/speaker resources associated with each device in the cluster.

According to some examples, the device clustering and digital assistant processing mechanisms described herein may be applied to voice commands received from cluster members. For example, one or more clustered devices may be integrated with one or more microphones for receiving and sending verbal communications from cluster members to a digital assistant service for processing according to the aspects described herein. In additional examples, the device clustering and digital assistant processing mechanisms described herein may be applied to gesture commands received from cluster members. For example, one or more clustered devices may be integrated with one or more cameras for receiving and sending videos and/or images of cluster members' behavior (e.g., gesture commands) to a digital assistant service for processing according to the aspects described herein. Gesture commands that may be received and processed according to aspects described herein include, for example, gestures supported by Xbox Kinect® (e.g., a user pointing the palm of her hand toward a display of a user interface, and moving her hand over items she wishes to select; a user keeping her hand in a hover location for a threshold duration of time over an item she would like to select to initiate selection of the item, e.g., cause a calendar to be displayed by one or more devices of a cluster, cause a calendar entry to be displayed or audibly communicated by one or more devices of a cluster, cause a document to be displayed by one or more devices of a cluster).

According to some aspects, once a cluster has been created, and an arbitrator device has been assigned as a cluster manager for the cluster, a user may provide a voice and/or gesture command for processing by a digital assistant, and a corresponding digital assistant service, associated with the arbitrator device. For example, when a cluster member provides a verbal and/or gesture command in proximity to the arbitrator device for a cluster, that command may be sent by the arbitrator device to a digital assistant service for processing. In some examples, if a command is issued via a gesture, one or more devices integrated with a camera may receive video data and/or image data of the gesture, and send the received video data and/or image data of the gesture to the digital assistant service via the arbitrator device. In additional examples, if a command is issued via a gesture, one or more devices integrated with a camera may receive video data and/or image data of the gesture, and send the received video data and/or image data of the gesture directly to the digital assistant service.

In some examples related to voice commands, processing the command may comprise performing voice analysis and/or linguistic analysis (e.g., applying one or more language models) on the command, and identifying based on that analysis, the user that issued the command. In identifying the user that issued the command, the digital assistant service may perform a match analysis of the voice analysis and/or linguistic analysis to one or more voice and/or linguistic profiles associated with each user in the cluster that has a digital assistant ID registered with the digital assistant service.

In additional examples related to gesture commands, processing the command may comprise performing gesture analysis, body movement analysis, and/or facial recognition analysis on the command, and identifying based on that analysis, the user that issued the command. In identifying the user that issued the command, the digital assistant may perform a match analysis of the gesture analysis, body movement analysis, and/or facial recognition analysis to one or more gesture profiles, movement profiles, and/or facial image profiles associated with each user in the cluster that has a digital assistant ID registered with the digital assistant service. In additional examples, a user that issued the gesture command may be identified by the digital assistant service based on a determined physical location where the command was issued in relation to the arbitrator device and/or one or more other devices of the cluster.

Processing of a verbal command by the digital assistant service may comprise identifying a command intent associated with the verbal command. The command intent may comprise a privacy intent (i.e., a sharing intent) associated with the command, and an execution intent associated with the verbal command. The privacy intent may comprise an indication of whether the member that issued a verbal command intends for the digital assistant service to respond to the command such that: only the issuing member may view the response, all of the cluster members may view and/or hear the response, a subset of the cluster members may view the response, or only a specific cluster member may view the response. An execution intent associated with the verbal command may comprise an indication of one or more operations that the digital assistant service should perform in responding to a command (e.g., display a document, send an electronic message, display an event in a scheduling application, create an event in a scheduling application, invite a non-cluster member to participate in an event, search one or more computing devices for a relevant response to a query in a query command, provide an audible response to a query command).

With regard to the privacy intent, in some examples a cluster member may indicate, and the digital assistant service may determine, via language in an issued digital assistant command, that the member intends for the digital assistant service to reply to the command in a manner such that all members of the cluster can view and/or hear the content of the digital assistant's reply. In other examples, a cluster member may indicate, and the digital assistant service may determine, via language in an issued digital assistant command, that the member intends for the digital assistant service to reply to the command in a manner such that only one or more specific members (including the member that issued the command) can view and/or hear the content of the digital assistant's reply. As such, when a verbal command is received by the digital assistant service, the digital assistant service may analyze one or more words or phrases in the command, and based on that analysis, determine a privacy level intent for providing a response to the command by the digital assistant service (e.g., a public intent, a personal intent, a low level privacy intent, a high level privacy intent).

In some examples, a determination that a command is associated with a low level privacy intent may comprise analyzing identified content for responding to the command, and determining that the content does not have a privacy level associated with it, or that that the content has a low privacy level associated with it. For example, metadata associated with identified content may indicate a privacy level or security level associated with the content. In other examples, a determination that a command is associated with a low level privacy intent may comprise analyzing identified content for responding to the command, and determining from one or more words, phrases, numbers and/or symbols in the content, that the content does not contain information with privacy concerns. In additional examples, a determination that a command is associated with a low level privacy intent may comprise analyzing one or more words or phrases in the command, and determining based on the analysis, that the cluster member issuing the command intends all of the cluster members to be presented with content identified for responding to the command.

Similarly, in some examples, a determination that a command associated with a high level privacy intent may comprise analyzing identified content for responding to the command, and determining that the content has a privacy level associated with it (or that the content has a privacy level associated with it other than low). In other examples, a determination that a command is associated with a high level privacy intent may comprise analyzing identified content for responding to the command, and determining from one or more words, phrases, numbers and/or symbols in the content, that the content contains information with privacy concerns. For example, the digital assistant service may flag certain words or word types, phrases or phase types, numbers or number types, symbols or symbols in relation to other content, as being associated with a privacy concern (e.g., personal names, key words such as "confidential" or "private", addresses, telephone numbers, social security numbers, dollar symbols). In additional examples, a determination that a command is associated with a high level privacy intent may comprise analyzing one or more words or phrases in the command, and determining based on the analysis, that the cluster member issuing the command intends that only a subset of cluster members be presented with content identified for responding to the command.

Upon determining a privacy intent associated with a command, an execution intent associated with the command, and/or an identity of a cluster member that issued the command, the digital assistant service may identify one or more devices of the cluster from which a response to the command will be provided. For example, if a determination is made that the privacy intent associated with a command comprises a public intent to share content (i.e., an intent to share content with all of the cluster members), the digital assistant service may identify one or more devices in the cluster that have presentation capabilities for presenting the content to all members of the cluster (e.g., a display size over certain dimensions, a largest display size in relation to each other device in the cluster, loudest or highest quality audio transmission capabilities of all of the devices in the cluster, a most central location in the cluster in relation to each other device in the cluster). In some examples, the digital assistant service may determine a single group presentation device from a plurality of available devices in a cluster for displaying or audibly communicating content in response to a command. In other examples, if a group presentation device is not available in a cluster, the digital assistant service may identify each device in the cluster that has display and/or audio capabilities, and display and/or audibly communicate identified content on each device that has requisite presentation capabilities for presenting identified content in response to a command.

In another example, if a determination is made that the privacy intent associated with a command comprises a personal intent (i.e., an intent to only present content to the cluster member that issued the command), the digital assistant service may identify a device in the cluster that is only associated with the member that issued the command, and display a response to the command on the identified device. In other examples, if a determination is made that the privacy intent associated with a command comprises an intent to share content with a subset of cluster members (i.e., one or more specific members of the cluster), the digital assistant service may identify one or more devices in the cluster corresponding to the subset of cluster members, and display a response to the command on the identified one or more devices.

In some examples, if a determination is made that the privacy intent associated with a command comprises a low level privacy intent, the digital assistant service may cause one or more identified devices to automatically present a response to the command. In additional examples, if a determination is made that the privacy intent associated with a command comprises a high level privacy intent, the digital assistant service may cause a confirmation prompt on the command issuing member's device to be surfaced. The confirmation prompt may comprise: a selectable user interface element for confirming that certain content should be provided to one or more cluster members in response to a command, a selectable user interface element for selecting clustered devices for presenting content in response to a command, and/or a selectable user interface element for selecting a manner of presenting content in response to a command (e.g., audible presentation, display presentation).

According to examples, machine learning may be applied in determining a command intent associated with a command issued by a cluster member. In some examples, historical information associated with cluster member commands may be stored and utilized for processing and identifying subsequent commands by those cluster members. For example, if a cluster member issues a command that is ambiguous as to privacy intent and/or execution intent, the digital assistant service may cause one or more devices in a corresponding cluster to ask the cluster member to verify a proposed command response by the digital assistant service. If the command response proposed by the digital assistant service is verified by the cluster member, similar commands by the cluster member may be automatically processed in a similar manner without requiring verification. If the command response proposed by the digital assistant service is not verified by the cluster member, or an explicit indication is made that the response proposed by the digital assistant is not a desired response, one or more different proposed responses may be proposed for verification by the cluster member. Similarly, a feedback mechanism may be utilized by the systems, methods, and devices described herein, whereby cluster members may indicate that a command response provided by one or more devices of a cluster, in association with the digital assistant service, were not appropriate based on a received command, and the digital assistant service may utilize that feedback in responding in a different manner for subsequent commands of a similar nature issued by cluster members. In some examples, machine learning and historical data may be utilized for identifying command intent associated with requests on a per-cluster basis, or on a per-cluster event basis. In other examples, one or more user selectable settings may be utilized for indicating to the digital assistant service one or more of: which cluster members to utilize machine learning and historical data for identifying a command intent, whether to utilize machine learning and historical data for identifying privacy intent, whether to utilize machine learning and historical data for identifying execution intent, whether machine learning and historical data for identifying a command intent should be applied only for the duration of a cluster event, and whether machine learning and historical data for identifying a command intent should be applied to subsequent clusters that include one or more of the same cluster members.

In some examples, a cluster may be dissolved upon a determination that a calendar event corresponding to the cluster has expired. In other examples, a cluster may be dissolved upon receiving, via a clustering application, an indication that the cluster should be dissolved. In still other examples, individual cluster members may remove themselves from a cluster by moving a corresponding clustered device a threshold distance from a cluster location. In additional examples, individual cluster members may remove themselves from a cluster by providing an indication to a clustering application, that they would like to be removed from a cluster.

FIG. 1 is a schematic diagram illustrating an example distributed computing environment 100 for assisting with execution of a command by a digital assistant in a clustered group of devices. Distributed computing environment 100 includes device cluster sub-environment 102, network 120, digital assistant processing and storage sub-environment 122, and command response computing device 106B.

Device cluster sub-environment 102 comprises a plurality of clustered computing devices, each of which is integrated with a digital assistant, and a plurality of cluster members associated with the plurality of computing devices. Specifically, device cluster sub-environment 102 comprises laptop computing device 104, group audio digital assistant device 114, tablet computing device 108, smart phone computing device 110, and group display digital assistant device 106A. Cluster member 112 is associated with laptop computing device 104, cluster member 116 is associated with tablet computing device 108, and cluster member 118 is associated with smart phone computing device 110. The association of each of those cluster members with their corresponding devices comprises at least a digital assistant account association, via a digital assistant service, between a member and a device.

Group audio digital assistant device 114, and group display digital assistant device 106A are each associated with a plurality of users, including cluster member 112, cluster member 116, and cluster member 118. That is, each of group audio digital assistant device 114, and group display digital assistant device 106A is integrated with a digital assistant associated, via a digital assistant service, with each of cluster member 112, cluster member 116, and cluster member 118.

In device cluster sub-environment 102, a cluster has been created comprising laptop computing device 104, group audio digital assistant device 114, tablet computing device 108, smart phone computing device 110, and group display digital assistant device 106A. The cluster may have been created based on a digital assistant service in digital assistant processing and storage sub-environment 122 receiving an indication, via network 120: that each of cluster members 112, 116, and 118 has a meeting or other cluster event scheduled in an application associated with his corresponding devices; that each of cluster members 112, 116, and 118 has executed a cluster sign-in process via a clustering application, or a clustering function in an application; and/or that a plurality of the devices in device cluster sub-environment 102 are identified as being within a threshold proximity of one another.

The digital assistant service executed on one or more computing devices, such as server computing device 124, in digital assistant processing and storage sub-environment 122, receives information, via network 120, about the cluster of devices in device cluster sub-environment 102. For example, each of the computing devices in the cluster, or a single arbitrator device of the cluster, may send information comprising one or more of: the content presentation capabilities of each device (e.g., whether a device has a display, the size of a display, whether a device has speakers, the quality of speakers, whether a device has group presentation capabilities); data input capabilities of each device (e.g., audio collection capabilities of each device, audio collection quality capabilities of each device, video collection capabilities of each device, video collection quality capabilities of each device); one or more users (i.e., cluster members) that are associated with each device; one or more users that are associated with a digital assistant account accessed from each device; and information from one or more accounts on each device that the digital assistant service has access to.

In some examples, the digital assistant service may automatically select one of the clustered devices in device cluster sub-environment 102 as an arbitrator for the cluster. The selection may be based on one or more pieces of information received from each device described above. In additional examples, the selection may be based, at least in part, on whether the digital assistant service is capable of identifying a speaking user from analysis of a verbal communication received from a specific device in the cluster. In still other examples, the selection may be based, at least in part, on whether the digital assistant service is capable of identifying a command intent from analysis of a verbal communication received from a specific user in the cluster.

In this example, the digital assistant service has selected, or assigned, group audio digital assistant device 114 as the arbitrator of the cluster. For example, the digital assistant service may have analyzed various capabilities associated with each of the devices in the cluster and determined that the audio collection capabilities of group audio digital assistant device 114 provide the highest quality audio for determining the identity of a speaking cluster member based on analysis of a received voice communication, as well as for determining a command intent associated with a received voice communication.

Once the digital assistant service selects group audio digital assistant device 114 as the arbitrator of the cluster, only that device is designated to directly handle digital assistant voice commands for the duration of the cluster. That is, while the cluster is in existence, and a cluster member speaks a digital assistant command in receivable proximity of the plurality of devices in the cluster, only the digital assistant application running on the arbitrator device of the cluster (in this example group audio digital assistant device 114) will transfer that communication to the digital assistant service for processing. In some examples, if a gesture command is issued by a cluster member, one or more devices of the cluster integrated with cameras may send video data and/or image data associated with an issued gesture command to an arbitrator device of the cluster for communicating to the digital assistant service for further processing of that gesture command. In still other examples, if a gesture command is issued by a cluster member, one or more devices of the cluster integrated with cameras may send video data and/or image data associated with an issued gesture command directly to the digital assistant service for further processing of that gesture command.

As illustrated, cluster member 116 in device cluster sub-environment 102 has issued a verbal command 128 within receivable proximity of each of the devices in device cluster sub-environment 102. In this example, the verbal command 128 spoken by cluster member 116 is: "show us our team's product sales from last year". The digital assistant application on the arbitrator device, in this case group audio digital assistant device 114, sends the verbal command 128, via network 120, to the digital assistant service in digital assistant processing and storage sub-environment 122.

In some examples, upon receiving the verbal command 128, the digital assistant service may analyze one or more vocal features and/or linguistic features of the verbal command 128, and make a determination as to the identity of the cluster member that issued the command. For example, digital assistant store 126 may comprise a plurality of digital assistant user profiles (including a user profile for each of cluster members 112, 116, and 118), with corresponding vocal and/or linguistic characteristics associated with those profiles, and the digital assistant service may match one or more vocal and/or linguistic features associated with the verbal command 128 to the characteristics of a user profile stored in digital assistant store 126. Rather than running a comprehensive match analysis for the verbal command 128 on each user profile stored in digital assistant store 126, to save time and processing costs, the digital assistant service may only run a match analysis for the verbal command 128 against user profiles for each of the cluster members in device cluster sub-environment 102 (i.e., cluster member 112, cluster member 116, and cluster member 118).

In additional examples, upon receiving the verbal command 128, the digital assistant service may analyze the verbal command 128 and identify a command intent associated with the verbal command 128. Identification of a command intent may comprise identifying a privacy intent (i.e., a sharing intent) associated with the command, and an execution intent associated with the verbal command. The execution intent may comprise an indication of one or more operations that the digital assistant service needs to execute to respond to the verbal command 128 (e.g., access information from a secondary application associated with a cluster member device and/or account, display a document, send an electronic message, display an event in a scheduling application, create an event in a scheduling application, invite a non-cluster member to participate in an event, search one or more computing devices for a relevant response to a query in a query command, provide an audible response to a query command) The privacy intent may comprise an indication of whether the member that issued verbal command 128 intends for the digital assistant service to respond to the command such that: only one issuing member may view the response; all of the cluster members may view and/or hear the response; a subset of the cluster members may view the response; or only a specific cluster member may view the response.

Regarding the execution intent, in this example, the digital assistant service analyzes the phrase "show us our team's product sales from last year" corresponding to verbal command 128, and identifies that the execution intent requires the digital assistant service to perform one or more of the following operations: access product sales data from one or more applications associated with one or more of the cluster members; cause a graph to be generated from sales data, identify one or more devices in the cluster that have display capabilities, and cause the generated graph to be displayed on one or more of the identified devices.

Regarding the privacy intent, in this example, the digital assistant service analyses the phrase "show us our team's product sales from last year" corresponding to verbal command 128. The digital assistant service may determine: based on the sub-phrase "show us our", that verbal command 128 indicates an intent to have the response content displayed to each cluster member in the cluster.

Upon identifying the command intent associated with the verbal command 128 (i.e., the execution intent and the privacy intent for the phrase "show us our team's product sales from last year"), the digital assistant service may access product sales data from one or more documents and/or one or more applications associated with one or more of the cluster members in device cluster sub-environment 102, cause a graph of those sales to be generated, analyze the display capabilities associated with each of the devices in the cluster, identify that group display digital assistant device 106A is a group display device, and therefore capable of displaying the generated graph to each cluster member, and cause the generated graph to be displayed on group display digital assistant device 106B (which is the same device as group display digital assistant device 106A depicted in device cluster sub-environment 102).

In some examples, the digital assistant service may determine a privacy level associated with verbal command 128. For example, the digital assistant service may determine that a high privacy level or a low privacy level is associated with verbal command 128 based on analysis of one or more of the following: one or more words or phrases in verbal command 128, one or more words, phrases, numbers and/or symbols included in content that is to be presented in response to verbal command 128, privacy metadata associated with content that is to be presented in response to verbal command 128, and a password being required to access content that is to be presented in response to verbal command 128. According to some examples, a determination is made that a high privacy level is associated with verbal command 128, the digital assistant service may cause a confirmation prompt to be displayed on the cluster member's device that issued verbal command 128, which must be selected prior the digital assistant service causing the sales graph to be displayed publicly on group display digital assistant device 106B. In examples, the confirmation prompt may comprise: a selectable user interface element for confirming that certain content should be provided to one or more cluster members in response to a command, a selectable user interface element for selecting clustered devices for presenting content in response to a command, and/or a selectable user interface element for selecting a manner of presenting content in response to a command (e.g., audible presentation, display presentation).

Figure 2:
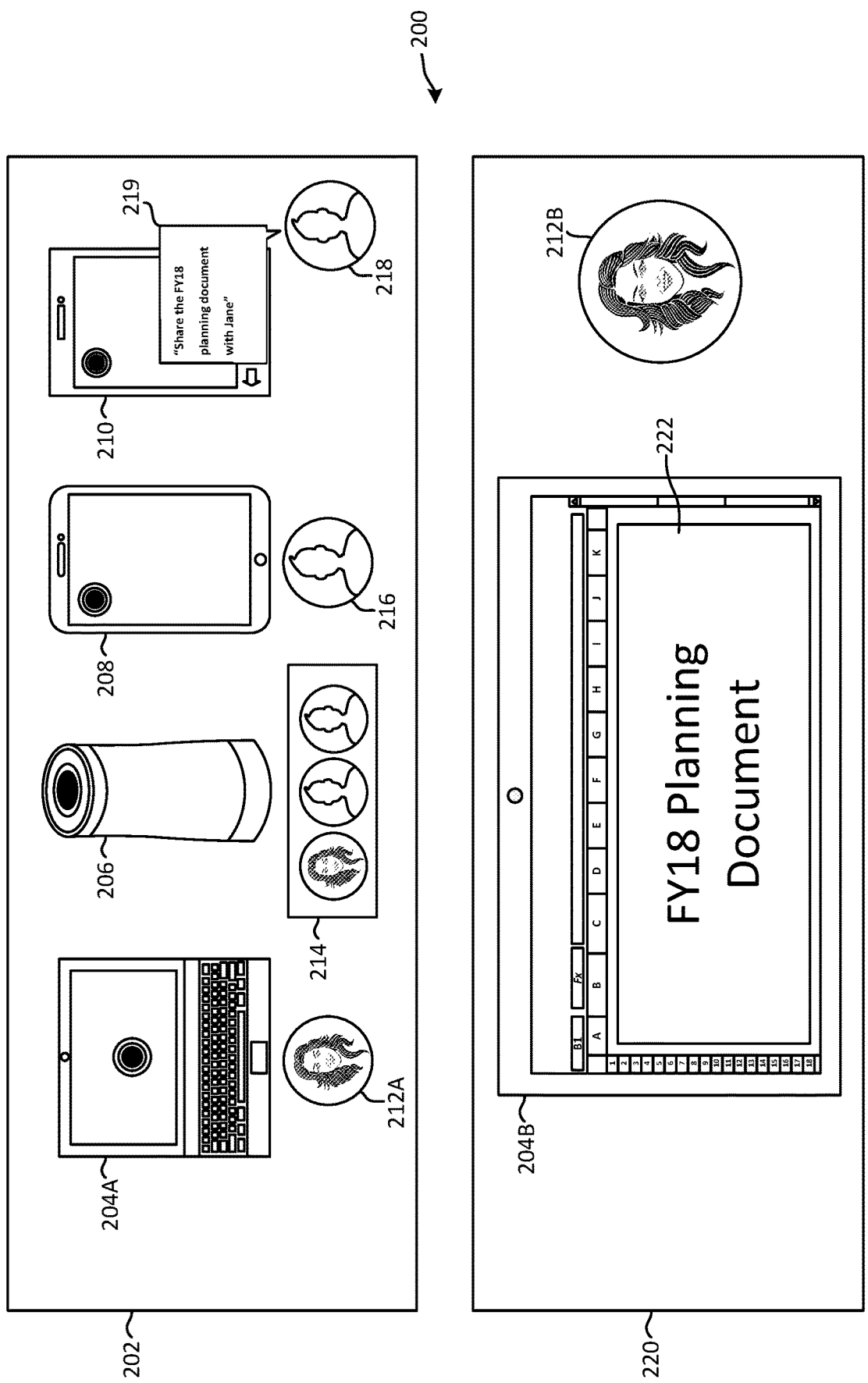
FIG. 2 illustrates an exemplary environment for sharing content with a plurality of members in a clustered group of devices.

According to other examples, if a determination is made that a low privacy level is associated with verbal command 128, the digital assistant service may not require that the public display operation be confirmed by the cluster member that issued verbal command 128 prior to displaying the sales graph on group display digital assistant device FIG. 2 illustrates an exemplary environment 200 for sharing content with a plurality of members in a clustered group of devices. Exemplary environment 200 includes device cluster sub-environment 202 and digital assistant command reply sub-environment 220. Each of the devices in device cluster sub-environment 202 is integrated with a digital assistant application.

Device cluster sub-environment 202 comprises a clustered group of devices comprising: laptop computing device 204A, tablet computing device 208, smart phone computing device 210, and group audio digital assistant device 206. Laptop computing device 204A, and the digital assistant application integrated with laptop computing device 204A, are associated with a digital assistant service user profile for cluster member 212A/212B. Tablet computing device 208, and the digital assistant application integrated with tablet computing device 208, are associated with a digital assistant service user profile for cluster member 216. Smart phone computing device 210, and the digital assistant application integrated with smart phone computing device 210, are associated with a digital assistant service user profile for cluster member Jane 218. Group audio digital assistant device 206, and the digital assistant application integrated with group audio digital assistant device 206, are associated with a plurality of user profiles. In this example, the plurality of user profiles associated with group audio digital assistant device 206, and its integrated digital assistant application, comprise user profiles for each of cluster member 212A/212B, cluster member 216, and cluster member Jane 218, as illustrated by cluster member element 214.

In this example, the digital assistant service associated with each of the clustered devices in device cluster sub-environment 202 has selected one of the clustered devices as an arbitrator device. According to some examples, the digital assistant service may have created an index comprising one or more of: the identities of each of the cluster members of the cluster, the identities of each of the devices in the cluster, the presentation capabilities associated with each of the devices in the cluster, the data reception capabilities associated with each of the devices in the cluster, and the identities of each of the applications associated with each device in the cluster that are accessible by the digital assistant service.

As shown in relation to device cluster sub-environment 202, cluster member 218 has issued verbal command 219 in reception proximity of each of the clustered devices in device cluster sub-environment 202. Specifically, verbal command 219 comprises a command to a digital assistant associated with each of the devices in device cluster sub-environment 202 to "Share the FY18 planning document with Jane". Verbal command 219 is communicated by the arbitrator device selected by the digital assistant service to the digital assistant service for processing. In processing verbal command 219, the digital assistant service may identify a user/cluster member that issued verbal command 219, and identify a command intent associated with verbal command 219. Identifying the command intent may comprise identifying an execution intent associated with verbal command 219, and identifying a privacy intent associated with verbal command 219.

In this example, in identifying a command intent associated with the verbal command 219, the digital assistant service has analyzed the phrase "Share the FY18 planning document with Jane" and determined that the cluster member that issued verbal command 219 (i.e., cluster member 218) intends for the digital assistant service to identify a "FY18 planning document", and cause the identified "FY18 planning document" to be shared. In identifying a privacy intent associated with the verbal command 219, the digital assistant service has analyzed the phrase "Share the FY18 planning document with Jane", and determined that the word "share" in association with the phrase "with Jane" in the command indicates that the member that issued the verbal command 219 intends for the digital assistant service to share the identified FY18 planning document with a specific cluster member of the cluster (i.e., cluster member Jane 212A/212B).

In determining how to reply to verbal command 219, the digital assistant service may analyze the index of information it generated associated with the cluster in device cluster sub-environment 202. The analysis of the index may comprise determining which of one or more devices in the cluster are associated with cluster member Jane 212A/212B, and none of the other cluster members. Thus, the digital assistant service has determined that laptop computing device 204A is the only device in the cluster that is associated with cluster member Jane 212A/212B, and none of the other cluster members. Therefore, in replying to verbal command 219, the digital assistant service causes the identified FY18 planning document 222 to be displayed only on the display 204B of laptop computing device 204A, as illustrated in digital assistant command reply sub-environment 220.

Figure 3:
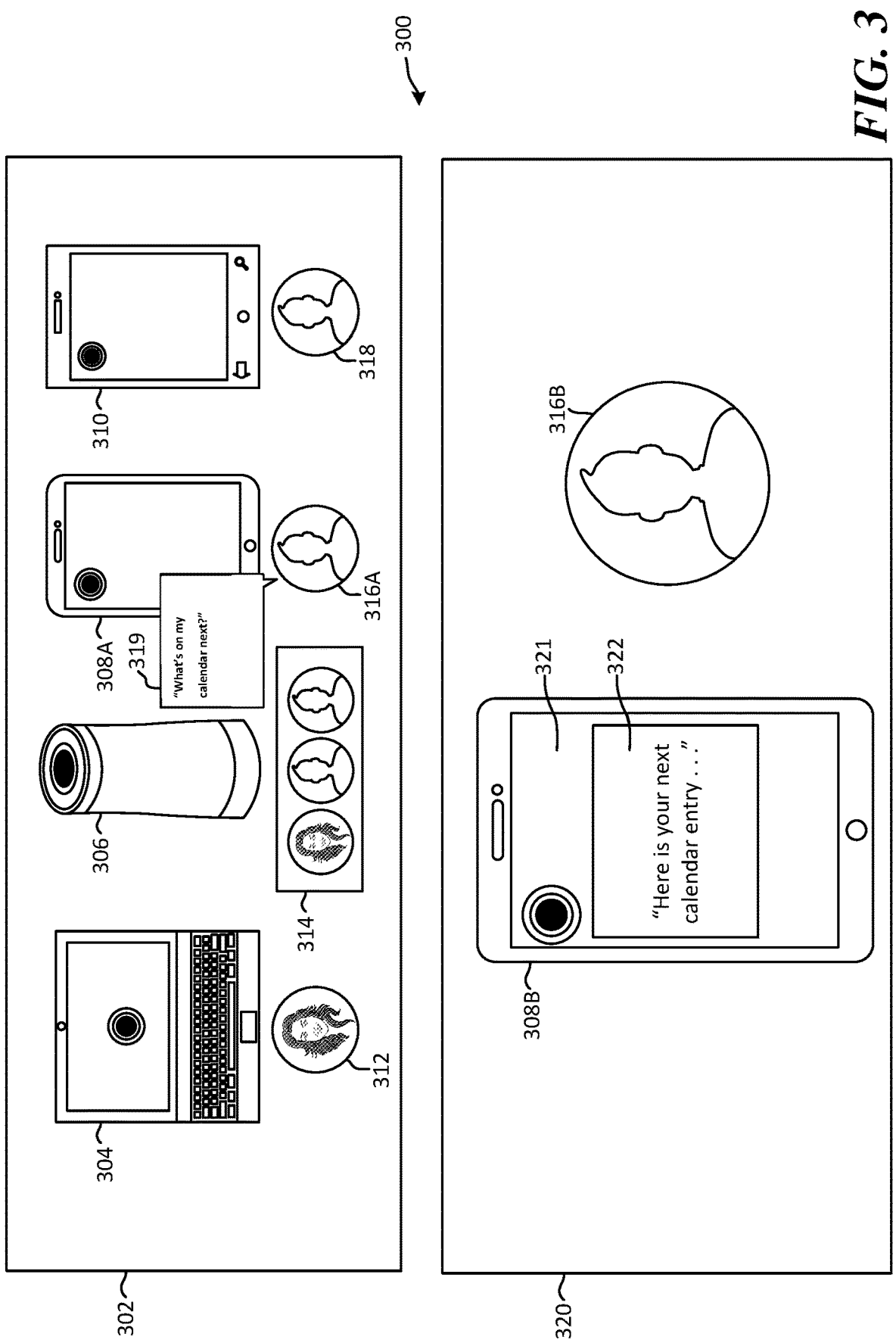
FIG. 3 illustrates an exemplary environment for surfacing personal content to a specific user in a clustered group of devices.

FIG. 3 illustrates an exemplary environment 300 for surfacing personal content to a specific user in a clustered group of devices. Exemplary environment 300 includes device cluster sub-environment 302 and digital assistant command reply sub-environment 320. Each of the devices in device cluster sub-environment 302 are integrated with a digital assistant application.

Device cluster sub-environment 302 comprises a clustered group of devices comprising: laptop computing device 304, tablet computing device 308A/308B, smart phone computing device 310, and group audio digital assistant device 306. Laptop computing device 304, and the digital assistant application integrated with laptop computing device 304, are associated with a digital assistant user profile for cluster member 312. Tablet computing device 308A/308B, and the digital assistant application integrated with tablet computing device 308A/308B, are associated with a digital assistant service user profile for cluster member 316A/316B. Smart phone computing device 310, and the digital assistant application integrated with smart phone computing device 310, are associated with a digital assistant service user profile for cluster member 318. Group audio digital assistant device 306, and the digital assistant application integrated with group audio digital assistant device 306, are associated with a plurality of user profiles. In this example, the plurality of user profiles associated with group audio digital assistant device 306, and its integrated digital assistant application comprise user profiles for each of cluster member 312, cluster member 316A/316B, and cluster member 318, as illustrated by cluster member element 314.

In this example, the digital assistant service associated with each of the clustered devices in device cluster sub-environment 302 has selected one of the clustered devices an arbitrator device. According to some examples, the digital assistant service may have created an index comprising one or more of: the identities of each of the cluster members of the cluster, the identities of each of the devices in the cluster, the presentation capabilities associated with each of the devices in the cluster, the data reception capabilities associated with each of the devices in the cluster, and the identities of each of the applications associated with each device in the cluster that are accessible by the digital assistant service.

As shown in relation to device cluster sub-environment 302, cluster member 316A/316B has issued verbal command 319 in reception proximity of each of the clustered devices in device cluster sub-environment 302. Specifically, verbal command 319 is a query to a digital assistant associated with each of the devices in device cluster sub-environment 302 comprising "What's on my calendar next". Verbal command 319 is communicated by the arbitrator device selected by the digital assistant service to the digital assistant service for processing. In processing the verbal command 319, the digital assistant service may identify a user/cluster member that issued verbal command 319, and identify a command intent associated with verbal command 319. Identifying the command intent may comprise identifying an execution intent associated with verbal command 319, and identifying a privacy intent associated with verbal command 319.

In this example, in identifying a command intent associated with the verbal command 319, the digital assistant service has analyzed the phrase "What's on my calendar next" and determined that the cluster member that issued verbal command 319 (i.e., cluster member 316A/316B) intends for the digital assistant service to identify a calendar event in cluster member 316A/316B's calendar application that is the next temporal event in cluster member 316A/316B's calendar application, and cause the identified next temporal event to be presented. In identifying a privacy intent associated with verbal command 319, the digital assistant service has analyzed the phrase "What's on my calendar next", and determined that "my" in association with the rest of the analyzed phrase indicates that the cluster member that issued the verbal command (i.e., cluster member 316A/316B) intends for the digital assistant service to present the identified next temporal event only to the cluster member that issued the verbal command.

In determining how to reply to verbal command 319, the digital assistant service may analyze the index information it generated associated with the cluster in device cluster sub-environment 302. The analysis of the index may comprise which of one or more devices in the cluster are associated with the cluster member that issued verbal command 319, and none of the other cluster members. Thus, the digital assistant service has determined that tablet computing device 308A/308B is the only device in the cluster that is associated with cluster member 316A/316B, and none of the other cluster members. Therefore, in replying to verbal command 319, the digital assistant service causes the identified next temporal event 322 from cluster member 316A/316B's calendar application to be displayed only on the display 321 of tablet computing device 308A/308B, as illustrated in digital assistant command reply sub-environment 320.

Figure 4:
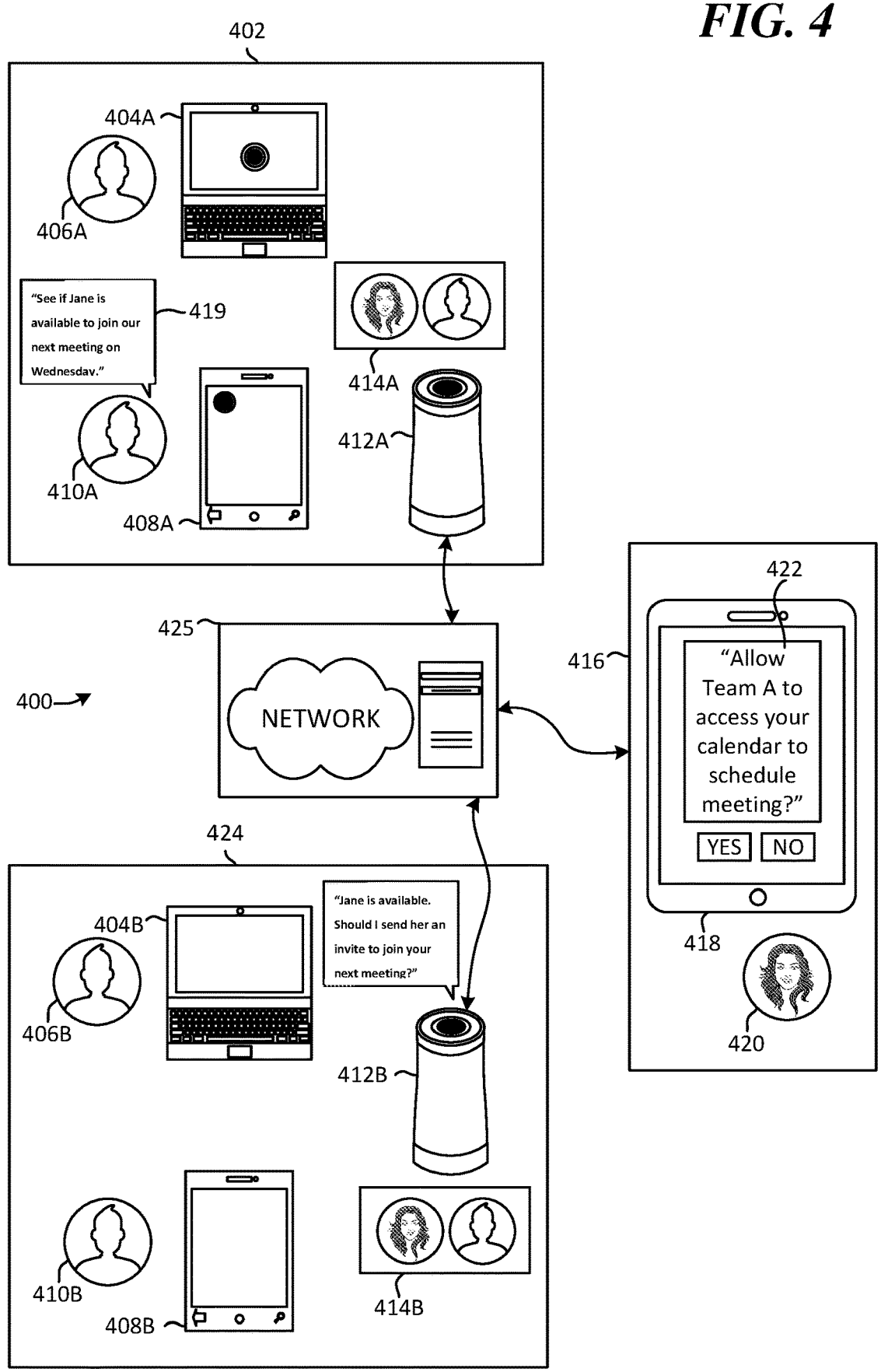
FIG. 4 illustrates an exemplary environment for requesting information from a user that is not included in a device cluster, and surfacing that information to users in the device cluster.

FIG. 4 illustrates an exemplary environment 400 for requesting information from a user that is not included in a device cluster, and surfacing that information to users in the device cluster. Exemplary environment 400 includes clustered device sub-environment 402, digital assistant reply sub-environment 424, non-clustered device sub-environment 416, and network and digital assistant service sub-environment 425. Each of the devices in device cluster sub-environment 402 are integrated with a digital assistant application.

Clustered device sub-environment 402 comprises a plurality of clustered devices. The plurality of clustered devices comprise laptop computing device 404A/404B, smart phone computing device 408A/408B, and group audio digital assistant device 412A/412B. Laptop computing device 404A/404B, and the digital assistant application integrated with laptop computing device 404A/404B, are associated with a digital assistant service user profile for cluster member 406A/406B. Smart phone computing device 408A/408B, and the digital assistant application integrated with smart phone computing device 408A/408B, are associated with a digital assistant service user profile for cluster member 410A/410B. Group audio digital assistant device 412A/412B, and the digital assistant application integrated with group audio digital assistant device 412A/412B, are associated with a plurality of user profiles. In this example, the plurality of user profiles associated with group audio digital assistant device 412A/412B, and its integrated digital assistant application, comprise user profiles for each of cluster member 406A/406B, cluster member 410A/410B, and non-cluster member 420, as illustrated by cluster member element 414A/414B.

In this example, the digital assistant service associated with each of the clustered devices in device cluster sub-environment 402 has selected group audio digital assistant device 412A/412B as an arbitrator device for the cluster. As such, only digital assistant device 412A/412B will directly handle verbal commands issued for the duration of the cluster. According to some examples, the digital assistant service may have created an index comprising one or more of: the identities of the cluster members of the cluster, the identities of each of the devices in the cluster, the presentation capabilities associated with each of the devices in the cluster, the data reception capabilities associated with each of the devices in the cluster, and the identities of each of the applications associated with each device in the cluster that are accessible by the digital assistant service.

As shown in relation to device cluster sub-environment 402, cluster member 410A/410B has issued verbal command 419 in reception proximity of each of the clustered devices in device cluster sub-environment 402. Specifically, verbal command 419 comprises a command to a digital assistant associated with each of the devices in device cluster sub-environment 402 to "See if Jane is available to join our next meeting on Wednesday". Verbal command 419 is communicated by the arbitrator device (i.e., group audio digital assistant device 412A/412B) to the digital assistant service in network and digital assistant service sub-environment 424 for processing.

In processing verbal command 419, the digital assistant service may identify a cluster member that issued verbal command 419, and identify a command intent associated with verbal command 419. In identifying the command intent, the digital assistant service may identify an execution intent associated with verbal command 419, and a privacy intent associated with verbal command 419. In this example, the digital assistant service may determine, in relation to identification of the execution intent associated with verbal command 419, that the cluster member that issued verbal command 419 intends for the digital assistant service to: identify a meeting event in an event scheduling application of each of the cluster members (i.e., the cluster member's next joint meeting), identify a user associated with the command (in this case Jane 420), determine whether the identified user is available during the time indicated in the identified meeting event, provide a response to the command Additionally, the digital assistant service may determine, in relation to identification of the privacy intent associated with the verbal command 419, that the cluster member that issued verbal command 419 intends for the digital assistant to provide a public response to the command based on one or more words or phrases in verbal command 419. For example, the digital assistant service may determine that the phrase "our next meeting" implies that the cluster member that issued verbal command 419 intends for the digital assistant service to provide a public response to the command.

In executing a response to verbal command 419, the digital assistant service may identify a user ID associated with user Jane 420, a computing device associated with user Jane 420 that is accessible by the digital assistant service, one or more scheduling applications associated with user Jane 420 that are accessible by the digital assistant service, and/or one or more messaging IDs associated with user Jane 420 that the digital assistant service may communicate with user Jane 420. The digital assistant service may identify this information from one or more of: a digital assistant user account store associated with the digital assistant service, and a contacts application associated with one or more of the cluster members and/or cluster member's associated accounts or devices.

In this example, the digital assistant service has identified that Jane's tablet computing device 418 is accessible to it, and caused a query 422 to be displayed on Jane's tablet computing device 418 in relation to verbal command 419. The query presented to Jane 420 asks, e.g., whether Jane 420 will "Allow Team A to access your calendar to schedule meeting?", with selectable user interface elements to allow or disallow the digital assistant service to access Jane's calendar to schedule a meeting with the cluster members (i.e., team A).

In the illustrated example, Jane 420 has responded to the query 422, indicating to the digital assistant service that Jane grants the digital assistant service access to Jane's calendar application for the specific purpose of checking whether she is available to meet during the cluster members' next meeting as indicated in verbal command 419. As such, the digital assistant service, or a digital assistant service executed on Jane's tablet computing device 418, accesses Jane's calendar application and determines that Jane is available to meet during the cluster members' next meeting. Upon determining that Jane is available to meet during the cluster members' next meeting, the digital assistant service identifies group audio digital assistant device 412A/412B as having group presentation capabilities for providing a public reply to verbal command 419 in accordance with the determined privacy intent for verbal command 419. As such, the digital assistant service causes group audio digital assistant device 412A/412B to audibly reply to verbal command 419 with the phrase "Jane is available. Should I send her an invite to join your next meeting?", as illustrated in relation to digital assistant reply sub-environment 424.

Figure 5:
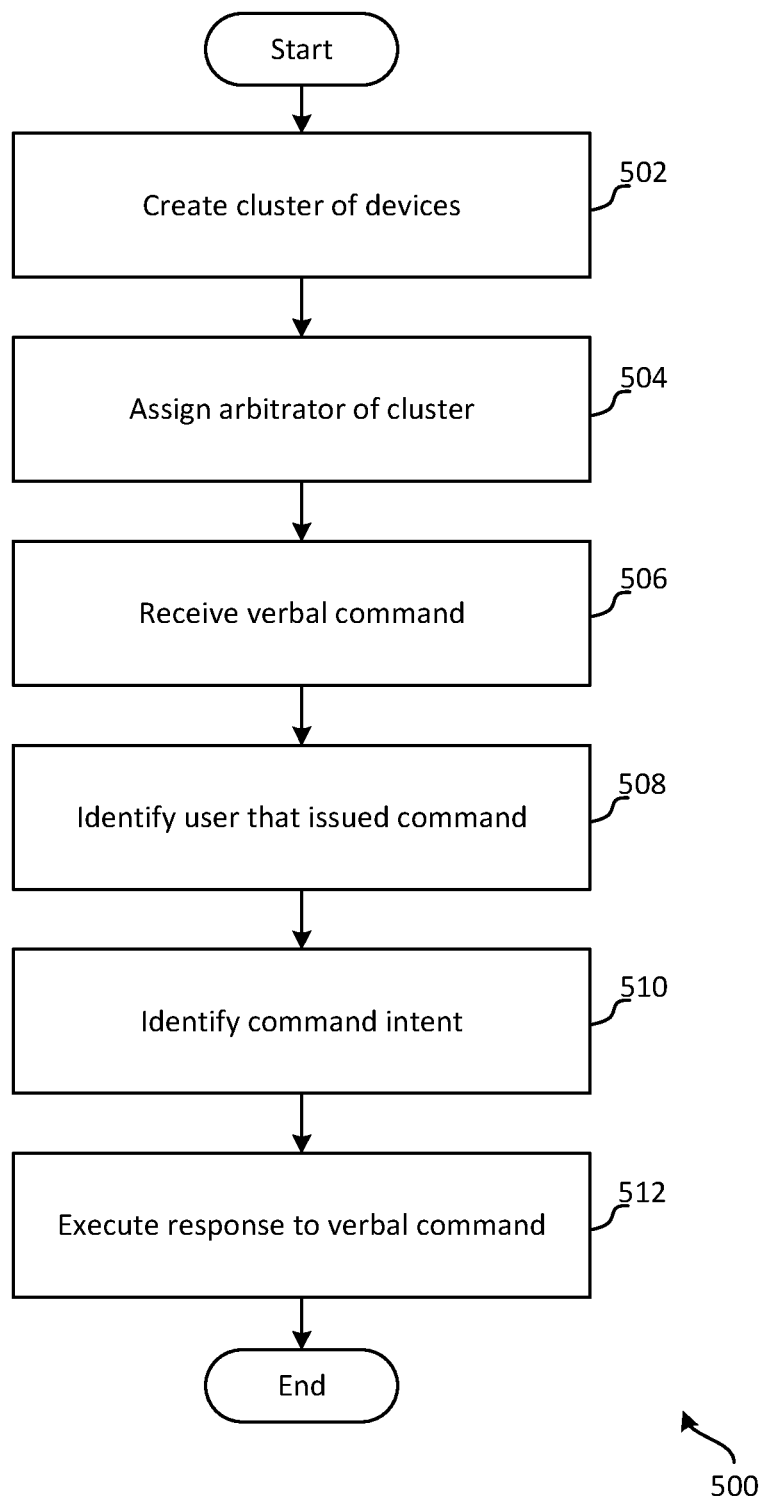
FIG. 5 is an exemplary method for assisting with execution of a voice command by a digital assistant in a clustered group of devices.

FIG. 5 is an exemplary method 500 for assisting with execution of a voice command by a digital assistant in a clustered group of devices. The method begins at a start operation, and flow moves to operation 502.

At operation 502 a cluster comprising a plurality of computing devices integrated a digital assistant is created. In some examples, the cluster may be automatically created upon determining one or more of the following: a plurality of devices associated with a same digital assistant are within a threshold proximity distance of each other, one or more applications associated with a plurality of devices indicate that a time of a clustering event for the plurality of devices has occurred, and a plurality of users have input a join cluster request to a clustering application or a clustering function in an event application. In some examples, upon creation of a cluster, a digital assistant service associated with each device in the cluster may create an index comprising one or more of: an identification of each device in the cluster, an identification of a digital assistant profile associated with each cluster member, applications of the cluster members that are accessible to the digital assistant service, presentation capabilities of each device in the cluster, and device input capabilities of each device in the cluster.

From operation 502 flow continues to operation 504 where one of the devices of the cluster is assigned as an arbitrator of the cluster. An arbitrator device may be automatically assigned based on criteria associated with the arbitrator device and/or each other device in a cluster. In some examples, a device of a cluster may be assigned as the arbitrator device of a cluster if a digital assistant service is capable of identifying a speaking user in association with the device. In additional examples, a device of a cluster may be assigned as the arbitrator device of a cluster if a digital assistant service is capable of identifying a command intent associated with a digital assistant command in association with the device. In other examples, a device of a cluster may be assigned as an arbitrator device of a cluster based on the device meeting one or more presentation or input reception criteria. In still other examples, the assignment of an arbitrator device from a plurality of devices of a cluster may be based on user selection.

Upon assignment of a device as an arbitrator device for a cluster, each digital assistant on each other device in the cluster may be disabled from directly responding to verbal commands for the duration of the cluster. For example, upon assigning one of the plurality of devices as an arbitrator device of a cluster, each other device in the cluster may be disabled from sending requests to a digital assistant service.

From operation 504 flow continues to operation 506 where a verbal command issued by a cluster member is received by a digital assistant service associated with the arbitrator device. The verbal command may comprise an indication to invoke a digital assistant, such as a digital assistant keyword or phrase. Additionally, because an arbitrator device has been assigned at operation 504, the arbitrator device of the cluster, and specifically the digital assistant executed on the arbitrator device, receives the verbal command and sends it to a cloud based digital assistant service where it is received at operation 506 for processing.

From operation 506 flow continues to operation 508 where the digital assistant service identifies the cluster member that issued the verbal command. In some examples, upon creating the cluster, the digital assistant service may generate an index comprising the identity of each device in the cluster, and the identity of each user associated with each device in the cluster. As such, in identifying the cluster member that issued the verbal command, the digital assistant service may perform voice and linguistic analysis on the received verbal command, and determine, based on the generated index, whether there is a digital assistant user profile associated with a cluster member of the index that has matching voice and/or linguistic features.

From operation 508 flow continues to operation 510 where the digital assistant service identifies a command intent associated with the verbal command. The command intent may comprise an execution intent and a privacy intent.

The privacy intent may comprise an indication of whether the member that issued a verbal command intends for the digital assistant service to respond to the command such that: only the issuing member may view the response, all of the cluster members may view and/or hear the response, a subset of the cluster members may view the response, or only a specific cluster member may view the response. An execution intent associated with the verbal command may comprise an indication of one or more operations that the digital assistant service should perform in responding to a command (e.g., display a document, send an electronic message, display an event in a scheduling application, create an event in a scheduling application, invite a non-cluster member to participate in an event, search one or more computing devices for a relevant response to a query in a query command, provide an audible response to a query command).

With regard to the privacy intent, in some examples a cluster member may indicate, and the digital assistant service may determine, via language in an issued digital assistant command, that the member intends for the digital assistant service to reply to the command in a manner such that all members of the cluster can view and/or hear the content of the digital assistant's reply. In other examples, a cluster member may indicate, and the digital assistant service may determine, via language in an issued digital assistant command, that the member intends for the digital assistant service to reply to the command in a manner such that only one or more specific members (including the member that issued the command) can view and/or hear the content of the digital assistant's reply. As such, when a verbal command is received by the digital assistant service, the digital assistant service may analyze one or more words or phrases in the command, and based on that analysis, determine a privacy level intent for providing a response to the command by the digital assistant service (e.g., a public intent, a personal intent, a low level privacy intent, a high level privacy intent).

In some examples, a determination that a command is associated with a low level privacy intent may comprise analyzing identified content for responding to the command, and determining that the content does not have a privacy level associated with it, or that that the content has a low privacy level associated with it. For example, metadata associated with identified content may indicate a privacy level or security level associated with the content. In other examples, a determination that a command is associated with a low level privacy intent may comprise analyzing identified content for responding to the command, and determining from one or more words, phrases, numbers and/or symbols in the content, that the content does not contain information with privacy concerns. In additional examples, a determination that a command is associated with a low level privacy intent may comprise analyzing one or more words or phrases in the command, and determining based on the analysis, that the cluster member issuing the command intends all of the cluster members to be presented with content identified for responding to the command.

Similarly, in some examples, a determination that a command associated with a high level privacy intent may comprise analyzing identified content for responding to the command, and determining that the content has a privacy level associated with it (or that the content has a privacy level associated with it other than low). In other examples, a determination that a command is associated with a high level privacy intent may comprise analyzing identified content for responding to the command, and determining from one or more words, phrases, numbers and/or symbols in the content, that the content contains information with privacy concerns. For example, the digital assistant service may flag certain words or word types, phrases or phase types, numbers or number types, symbols or symbols in relation to other content, as being associated with a privacy concern (e.g., personal names, key words such as "confidential" or "private", addresses, telephone numbers, social security numbers, dollar symbols). In additional examples, a determination that a command is associated with a high level privacy intent may comprise analyzing one or more words or phrases in the command, and determining based on the analysis, that the cluster member issuing the command intends that only a subset of cluster members be presented with content identified for responding to the command.

From operation 510 flow continues to operation 512 where a response to the verbal command is executed by the digital assistant service. In executing a response to the verbal command, the digital assistant service may determine one or more devices of the cluster to present the response based on the command intent identified at operation 510, and presentation features associated with each device of the cluster. Thus, the digital assistant service may match identified execution intent and privacy intent requirements against features of each device in the generated index, and identify one or more devices of the cluster for displaying and/or audibly communicating the response during its execution at operation 512.

From operation 512 flow continues to an end operation, and the method 500 ends.

Figure 6:
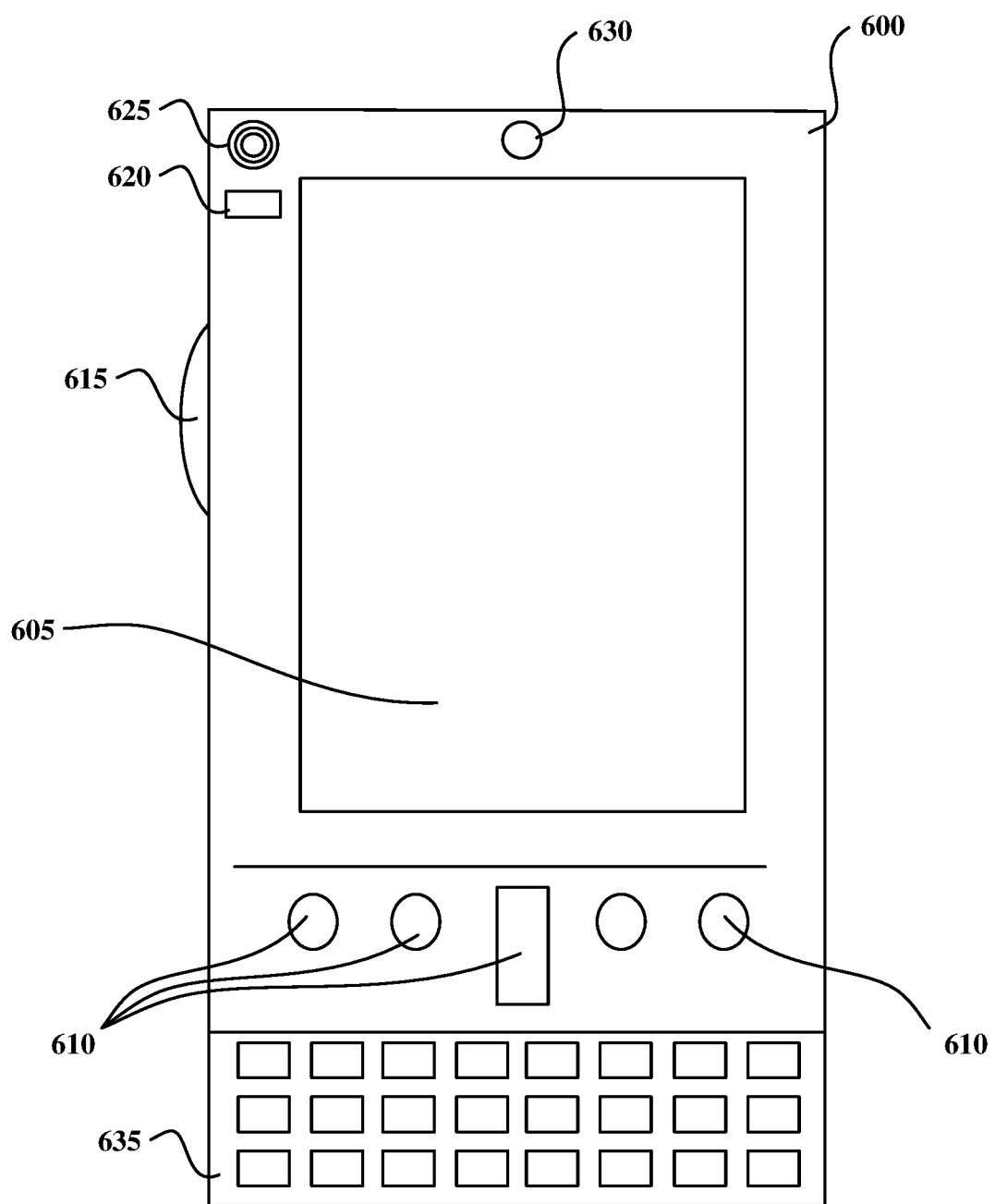
FIGS. 6 and 7 are simplified diagrams of a mobile computing device with which aspects of the disclosure may be practiced.
Figure 7:
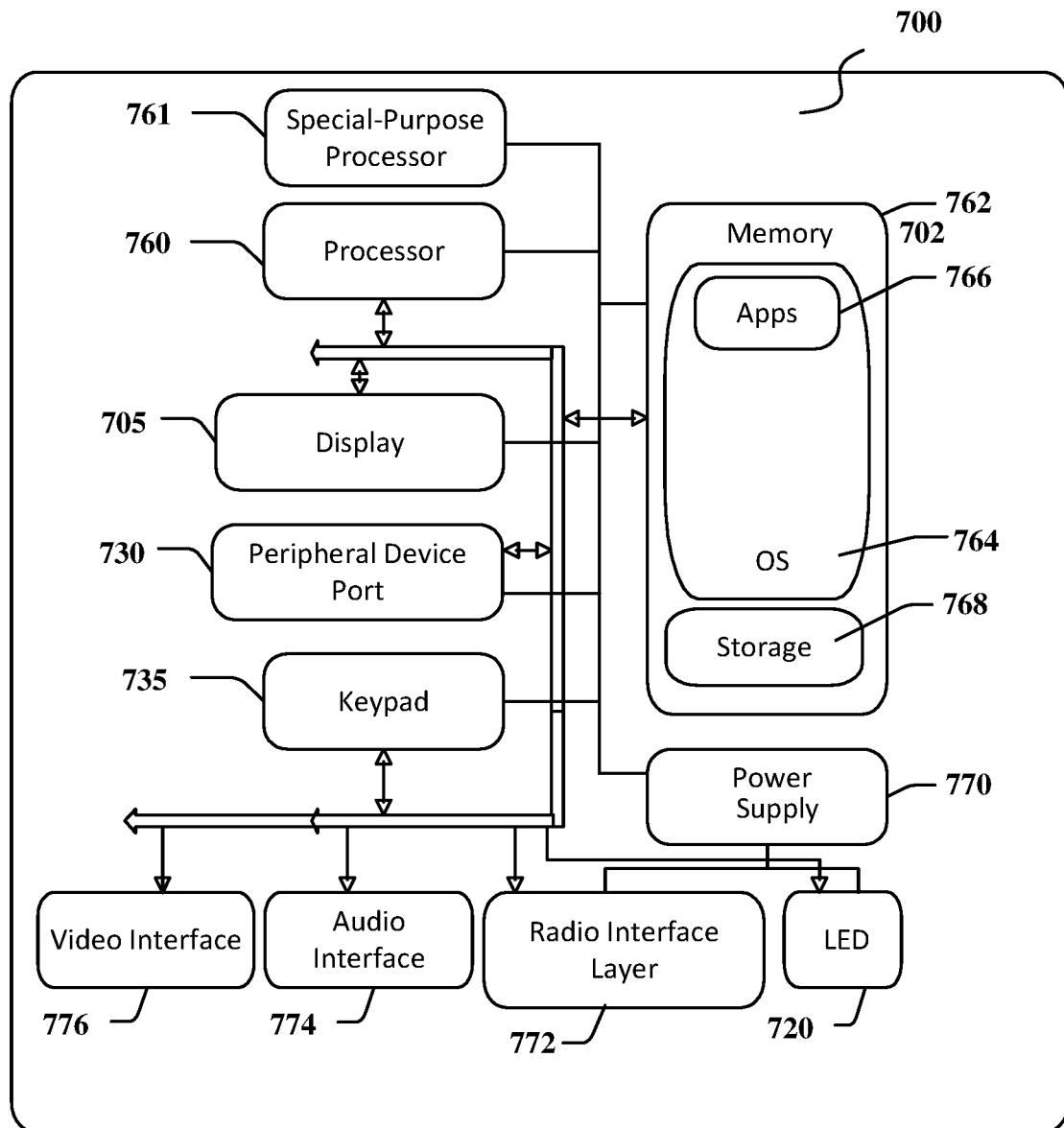

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant clustering computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
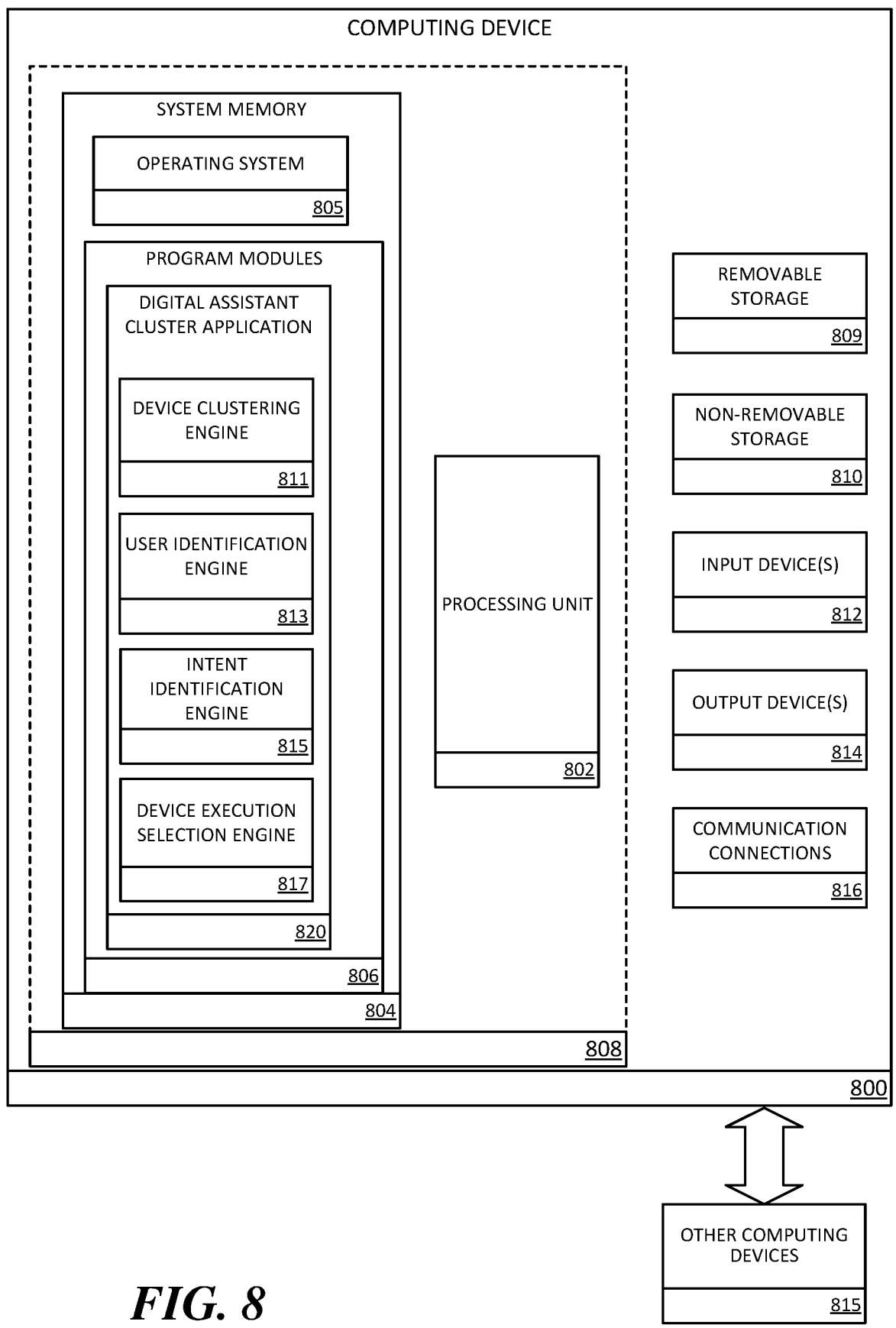
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with execution of verbal digital assistant commands in a group device environment.

In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or digital assistant clustering programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., digital assistant clustering application 820) may perform processes including, but not limited to, the aspects, as described herein. According to examples, the device clustering engine 811 may perform one or more operations associated with determining whether devices should be clustered by a digital assistant service. The user identification engine 813 may perform one or more operations associated with analyzing a verbal command and determining, based on vocal analysis and/or linguistic analysis, the identity of a cluster member that issued the command. Intent identification engine 815 may perform one or more operations associated with identifying an execution intent associated with a verbal command, and identifying a privacy intent associated with a verbal command Device execution selection engine 817 may perform one or more operations associated with determining one or more devices of a cluster from which to present a response to a digital assistant verbal command.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
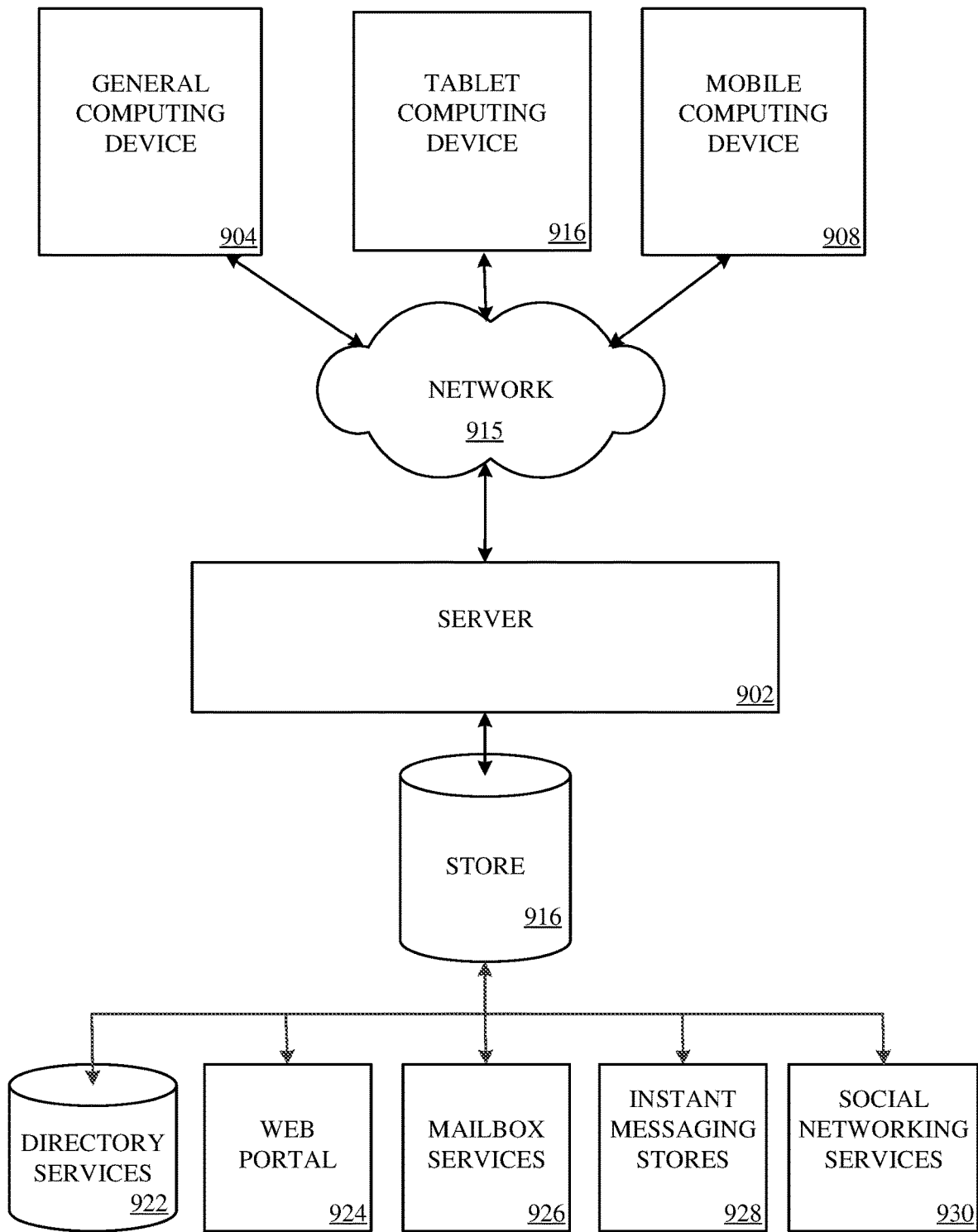
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The systems, methods, and devices described herein provide technical advantages for improving interactions with digital assistants in group device environments. The ability to automatically cluster devices integrated with digital assistants for the duration of a cluster event according to the aspects described herein provides a better user experience, while also reducing time and processing costs associated with executing digital assistant commands and requests in group device environments. A better user experience is achieved due to the ability of a cluster to eliminate multiple devices from responding to a same voice command, while also providing mechanisms for responding to requests in a manner consistent with the privacy intent of a cluster member that issued a command. For example, typically when digital assistants respond to verbal commands, they do not take into account the possibility of other users being in the presentation area when they respond, and potentially overhearing and/or viewing a digital assistant response that the command issuer would like to keep private. Examples described herein provide mechanisms for determining a privacy intent associated with a verbal command issued to a digital assistant, and selecting one or more appropriate devices for issuing a reply to the verbal command based on that privacy intent. Costs associated with processing verbal commands in group device settings are also reduced by the systems, methods, and devices described herein. For example, by assigning an arbitrator device to a cluster of devices as described herein, multiple devices will no longer directly respond to requests in a group device setting, thereby reducing not only the client-side processing, but also the network traffic involved with providing multiple digital assistant client requests to a digital assistant service for a same command, and reducing the costs associated with processing multiple same digital assistant commands by a receiving digital assistant service.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for executing a voice command by a digital assistant in a group device environment, the method comprising:
   determining a start time for an event in a calendar application associated with each of a plurality computing of devices;
   creating, based on the event, a cluster comprising the plurality of computing devices associated with the event, wherein each of the plurality computing of devices is integrated with a digital assistant;
   assigning one of the plurality of computing devices as an arbitrator device of the cluster;
   receiving, by a digital assistant service associated with the arbitrator device, a verbal command comprising a request to surface first content;
   determining a privacy level based on analyzing the first content;
   identifying a user that issued the verbal command;
   causing, based on the determined privacy level, a prompt to be surfaced on a computing device associated with a user account of the user that issued the verbal command, the prompt comprising a selectable user interface element for confirming that the first content should be surfaced to one or more computing device of the cluster;
   receiving a selection on the selectable user interface element corresponding to a first computing device of the one or more computing devices of the cluster; and
   causing the first content to be surfaced by the first computing device.

2. The method of claim 1, wherein, upon assigning one of the plurality of computing devices as an arbitrator device of the cluster, the arbitrator computing device acts as a primary digital assistant command handler of the cluster, and each other computing device in the cluster is configured not to respond to verbal commands for the duration of the cluster.

3. The method of claim 1, further comprising:
   receiving, by the digital assistant service associated with the arbitrator device, a second verbal command;
   determining that the second verbal command is associated with an intent to audibly execute the response; and
   causing, upon determining that the second verbal command is associated with an intent to audibly execute the response, a computing device of the cluster to audibly execute the response.

4. The method of claim 1, further comprising:
   receiving, by the digital assistant service associated with the arbitrator device, a second verbal command;
   determining that the second verbal command is associated with an intent to display content; and
   causing, upon determining that the second verbal command is associated with an intent to display content to a plurality of members at the event, a computing device of the cluster to display the response to the second verbal command.

5. The method of claim 1, further comprising:
   receiving, by the digital assistant service associated with the arbitrator device, a second verbal command; and
   identifying a command intent associated with the second verbal command, wherein identifying a command intent associated with the second verbal command comprises determining whether the second verbal command is associated with an intent to present content to a specific member at the event.

6. The method of claim 5, wherein executing the response to the second verbal command further comprises:
   causing, upon determining that the second verbal command is associated with an intent to present content to the specific member at the event, the response to be displayed on a computing device of the specific member.

7. The method of claim 1, further comprising:
   applying a natural language model to the verbal command; and
   determining, based on the applied natural language model, whether the verbal command comprises an intent to: share content with a plurality of members at the event, or share content with a specific member at the event.

8. The method of claim 1, wherein the arbitrator device is automatically selected based on determining that the arbitrator device is associated with a service that is capable of identifying a user based on voice analysis.

9. The method of claim 1, further comprising:
   determining that a plurality of computing devices of the cluster are capable of identifying a user based on voice analysis; and
   automatically selecting the arbitrator device, from the plurality of computing devices of the cluster that are capable of identifying a user based on voice analysis, based on the arbitrator device having the most available presentation resources available to it.

10. The method of claim 1, wherein creating the cluster is further based on determining that each of the plurality of computing devices is within a physical proximity threshold of one another.

11. The method of claim 1, wherein determining the privacy level based on analyzing the first content comprises:
   determining from one or more of: one or more words, one or more phrases, one or more numbers, and one or more symbols, that the first content contains information with privacy concerns.

12. The method of claim 1, wherein the determined privacy level is a high privacy level.

13. The method of claim 12, wherein the high privacy level is determined based on identifying a social security number in the first content.

14. A system for executing a voice command by a digital assistant in a group device environment, comprising:
   a memory for storing executable program code; and
   one or more processors, functionally coupled to the memory, the one or more processors being responsive to computer-executable instructions contained in the program code and operative to:
      determine that a computing device has signed into an event associated with an electronic calendar application;
      create, based on the event, a cluster comprising a plurality of computing devices associated with the event, wherein each of the plurality of computing devices is integrated with a digital assistant;

receive a verbal command issued by a member of the event, the verbal command comprising a request to surface first content;

determine a privacy level based on analyzing the first content;

cause, based on the determined privacy level, a prompt to be surfaced on a computing device associated with a user account of the member that issued the verbal command, the prompt comprising a selectable user interface element for confirming that the first content should be surfaced to one or more computing devices of the cluster;

receive a selection on the selectable user interface element corresponding to a first computing device of the one or more computing devices of the cluster; and cause the first content to be surfaced by the first computing device.

15. The system of claim 14, wherein the one or more processors are further responsive to the computer-executable instructions and operative to:

assign one of the plurality of computing devices as an arbitrator device of the cluster, wherein the arbitrator device is capable of matching a digital assistant service user account ID to a user's voice based on analysis of the verbal command.

16. The system of claim 14, wherein creating the cluster is further based on determining that each of the plurality of computing devices is within a physical proximity threshold of one another.

17. The system of claim 14, wherein in determining the privacy level based on analyzing the first content, the one or more processors are further responsive to the computer-executable instructions contained in the program code and operative to:

determine from one or more of: one or more words, one or more phrases, one or more numbers, and one or more symbols, that the first content contains information with privacy concerns.

18. A computer-readable storage device comprising executable instructions that, when executed by one or more processors, assist with executing a voice command by a digital assistant in a group device environment, the computer-readable storage device including instructions executable by the one or more processors for:

determining a start time for an event in a calendar application associated with each of a plurality of computing devices;

creating, based on the determination, a cluster comprising the plurality of computing devices associated with the event, wherein each of the plurality of computing devices is integrated with a digital assistant;

assigning one of the plurality of computing devices as an arbitrator device of the cluster;

disabling, upon assignment of the arbitrator device, each digital assistant on each of the other computing devices of the cluster from responding to verbal commands for the duration of the cluster;

receiving a verbal command from a member of the event, the verbal command comprising a request to surface first content;

determining a privacy level based on analyzing the first content;

causing, based on the determined privacy level, a prompt to be surfaced on a computing device associated with a user account of the member that issued the verbal command, the prompt comprising a selectable user interface element for confirming that the first content should be surfaced to one or more computing devices of the cluster;

receiving a selection on the selectable user interface element corresponding to a first computing device of the one or more computing devices of the cluster; and causing the first content to be surfaced by the first computing device.

19. The computer-readable storage device of claim 18, wherein the instructions are further executable by the one or more processors for:

determining whether one or more words or phrases of the verbal command indicate an intent to share content with a plurality of members at the event; and determining whether one or more words or phrases of the verbal command indicate an intent to share content with a specific member at the vent.

20. The computer-readable storage device of claim 18, wherein creating the cluster is further based on determining that each of the plurality of computing devices is within a physical proximity threshold of one another.

* * * * *